United States Patent Office 3,408,487
Patented Oct. 29, 1968

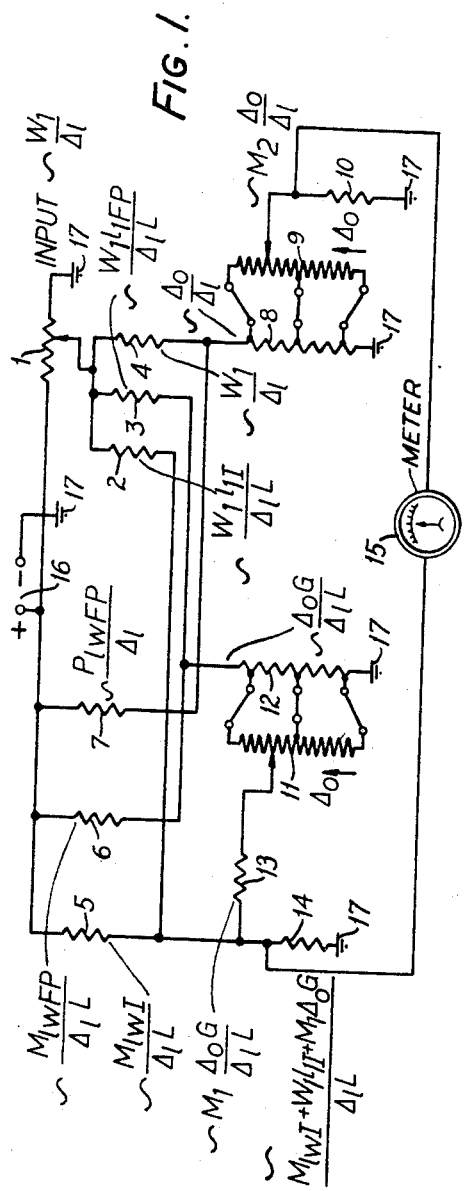
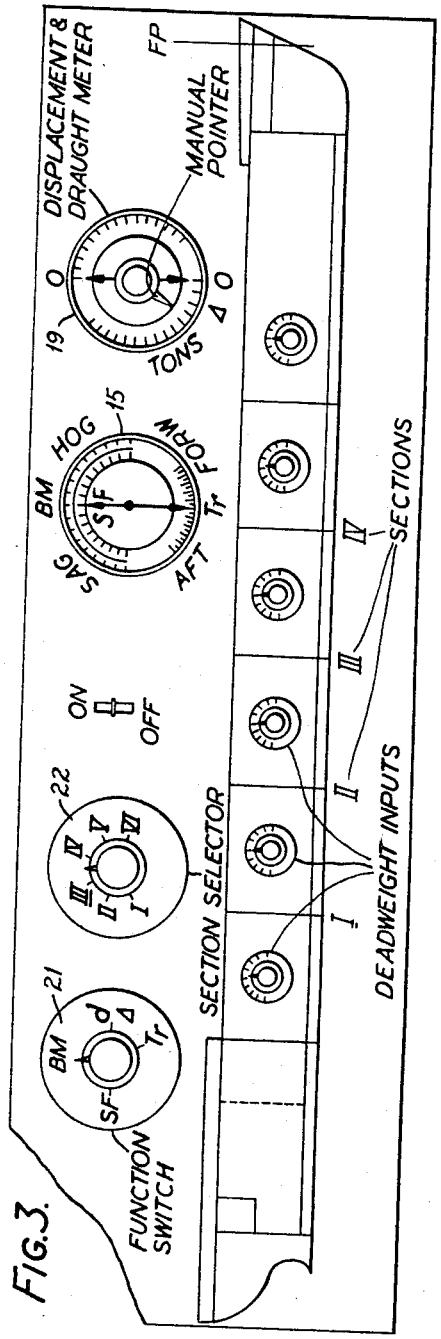

3,408,487
APPARATUS FOR CALCULATING THE LOADING EFFECT IN A SHIP
Gustavus de Wilde, 188 Klimopstraat, The Hague, Netherlands
Filed Mar. 10, 1964, Ser. No. 350,847
Claims priority, application Great Britain, Mar. 11, 1963, 9,575/63; Nov. 29, 1963, 42,671/63
4 Claims. (Cl. 235—150.2)

ABSTRACT OF THE DISCLOSURE

Electrical analogue apparatus for calculating the bending moment, shearforce and trim at any one of a plurality of sections along the length of a ship resulting from a presupposed distribution of load in the ship. The calculating circuit of the apparatus comprises a plurality of adjustable inputs each of which corresponds to a load in a compartment of the ship. By manual manipulation of a selector switch a reading of the bending moment, shearforce or trim at a given section can be obtained.

---

This invention relates to instruments for predicting the effects on a ship of loading the ship, in order to assist in loading the ship as fully as possible without setting up excessive stresses or causing excessive trim.

According to the invention there is provided apparatus for calculating the bending moment and/or shearforce at any one of a plurality of sections along the length of a ship resulting from a presupposed distribution of load in the ship characterized by an electrical calculating circuit having a plurality of input means corresponding to the portions of the ship which are separated by said sections, each said input means being adjustable with respect to the dead weight in the corresponding said portion, a selector connected in said circuit for selecting that section with respect to which the calculation is to be made, and indicator means responsive to the output of said circuit for indicating the bending moment and/or shearforce calculated thereby.

More particularly the apparatus calculates by means of electrical analogues the bending moment at at least one arbitrarily chosen section in the ship. The shearforce at these sections or at any other arbitrarily chosen sections and the trim, draught, and displacement resulting from any loading may also be calculated.

The invention will be more particularly described with reference to the accompanying drawings in which:

FIGURE 1 is a basic calculating circuit to illustrate the principles of the invention;

FIGURE 3 shows a control and indicating panel for a practical calculating circuit.

Figure 2A:
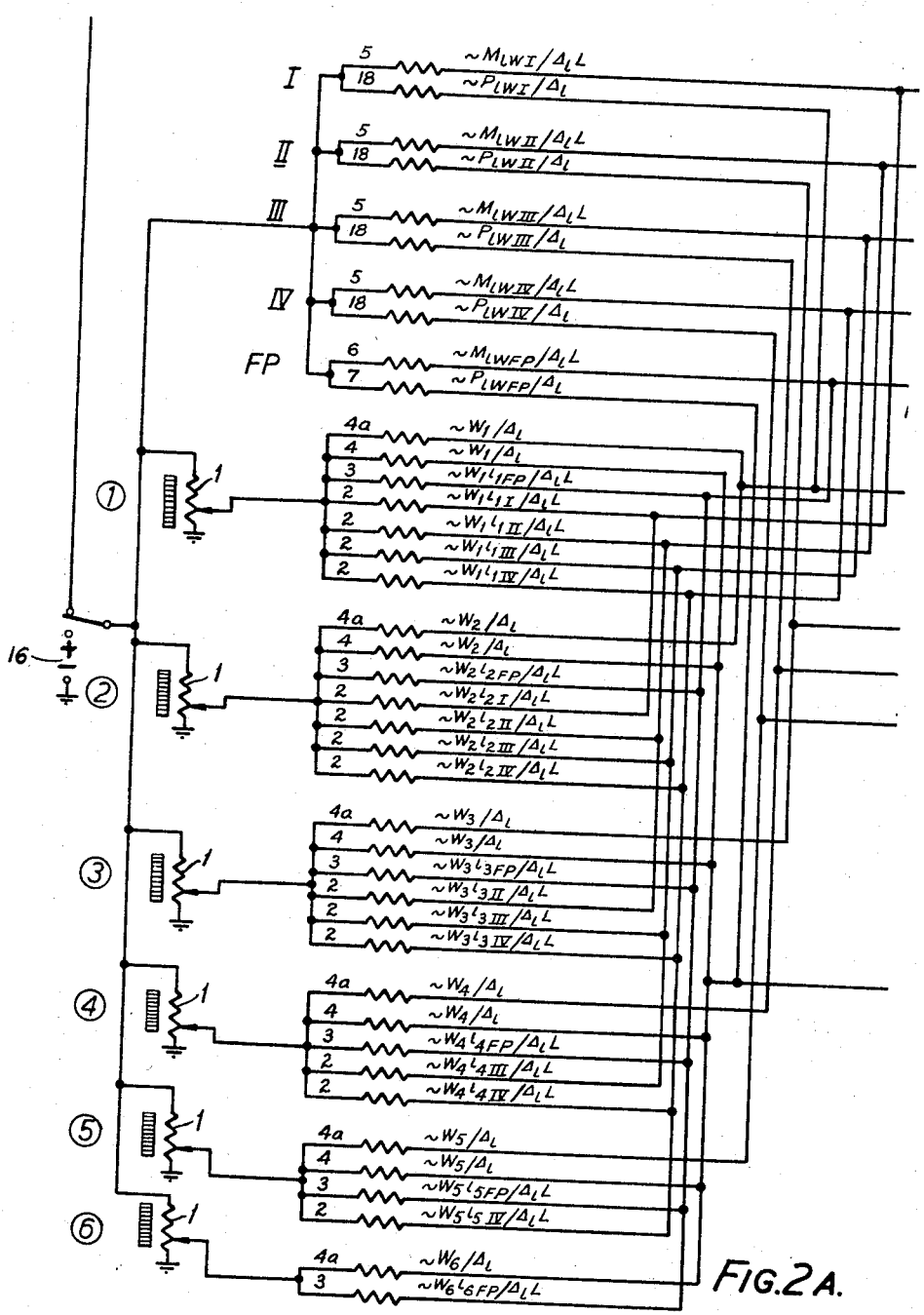
FIGURES 2A and 2B show together the practical calculating circuit.

Before describing the drawings, reference will be made to the principles on which the calculations are based.

It can be shown that the bending moment (BM), i.e. the difference between the moments of weight and moments of buoyancy on one side of a section about that section, is given by (1)
$$BM\left(\frac{M_{1wm}}{\Delta_1 L}+\sum_1^{n'}\frac{W_n l_n}{\Delta_1 L}+\frac{M_1\cdot\Delta_0 G}{\Delta_1 L}-\frac{M_2\cdot\Delta_0}{\Delta_1}\right)\Delta_1 L$$

where $M_{1wm}$ is the moment of all the lightweight aft of the section
$\Delta_1$ is the moulded displacement at load draught
$L$ is the length of the ship between perpendiculars
$W_n l_{nm}$ is the moment of deadweight item $W_n$ distant $l_{nm}$ aft of the section
$M_1$ and $M_2$ are dimensionless functions of draught and of position of section
$\Delta_0$ is the sum of all lightweight and deadweight
$G$ is the distance of the longitudinal centre of gravity of the loaded ship from the fore perpendicular of the ship.

The shearforce (SF), i.e. the difference between the weight and the buoyancy aft of the section, is given by (2)
$$SF=\left(\frac{P_{1wm}}{\Delta_1}+\sum_1^{nl}\frac{W_n}{\Delta_1}+\frac{P_1\Delta_0 G}{\Delta_1 L}-\frac{P_2\Delta_0}{\Delta_1}\right)\Delta_1$$

where $P_{1w}$ is the total lightweight aft of the section $$\sum_1^{nl} W_n$$

is the total deadweight aft of the section
$P_1$ and $P_2$ are dimensionless functions of draught and of position of section.

The trim of the ship is given by (3)
$$Tr=\left(\frac{T_1\cdot\Delta_0 G}{\Delta_1 L}-\frac{T_2\Delta_0}{\Delta_1}\right)L$$

where $T_1$ and $T_2$ are dimensionless functions of draught.

In each of the above expressions the quantities in brackets are dimensionless and independent of the size of the ship, being identical for geometrically similar ships similarly loaded. It is found that the dimensionless functions, P, M, T can be approximately represented by two or more straight lines. It is proposed therefore to generate electrical analogues for these functions by means of suitable resistors and tapped potentiometers, these being combined with further analogues representing the (fixed) lightweight items and the (variable) deadweight items to give electrical analogues of the above expressions, which can then be displayed in any suitable manner.

A basic circuit (see FIGURE 1) for calculating the bending moment at one section designated I in a ship resulting from one item $W_1$ of deadweight may be built up as follows.

A variable potentiometer 1 generates at its wiper a voltage proportional to the deadweight $W_1$ and hence to $W_1/\Delta_1$, the wiper position forming the variable input to the circuit. In series with the wiper are three parallel fixed resistors 2, 3 and 4 generating currents proportional to $W_1 l_{1I}/\Delta_1 L$, $W_1 l_{1FP}/\Delta_1 L$, and $W_1/\Delta_1$ respectively, where subscript FP refers to the moment taken about the fore perpendicular FP. All quantities other than $W_1$ are fixed by the design of ship and by the position of section I. In parallel with the potentiometer 1 are a further three parallel fixed resistors 5, 6 and 7 generating currents proportional to $M_{1wI}/\Delta_1 L$, $M_{1wFP}/\Delta_1 L$, and $P_{1wFP}/\Delta_1$ respectively. The outputs of the two groups of three resistors are added in pairs 2+5, 3+6 and 4+7 to give $$W_1 l_{1I}/\Delta_1 L + M_{1wI}/\Delta_1 L$$
$$W_1 l_{1FP}/\Delta_1 L + M_{1wFP}/\Delta_1 L = \Delta_0 G/\Delta_1 L$$

and $$W_1/\Delta_1 + P_{1wFP}/\Delta_1 = \Delta_0/\Delta_1$$

Quantity $\Delta_0/\Delta_1$ is applied to a voltage divider 8 across which is connected a tapped potentiometer 9, whose wiper is set in accordance with the value of $\Delta_0$ (i.e. $W_1 + P_{1wFP}$) and is provided with a suitable load resistor 10, to provide a voltage at the wiper proportional to $M_2 \Delta_0/\Delta_1$. A second tapped potentiometer 11, connected across a voltage divider 12, has its wiper connected in series with a resistor 13 which generates $M_1 \Delta_0 G/\Delta_1 L$. The current thus generated is added to the output of the first pair of resistors 2 and 5 and connected to load resistor 14 to give a voltage proportional to $$\frac{M_1 \Delta_0 G + W_1 l_{1I} + M_{1w} I}{\Delta_1 L}$$

This voltage is applied to a suitable meter in opposition to the output of the first tapped potentiometer 9. The meter deflection thus being proportional to $$\frac{M_1 \Delta_0 G}{\Delta_1 L} + \frac{W_1 l_{1I}}{\Delta_1 L} + \frac{M_{1wI}}{\Delta_1 L} - \frac{M_2 \Delta_0}{\Delta_1}$$

i.e. to the bending moment BM as given by Equation 1.

A D.C. power supply 16 has its positive terminal connected to the junction of the potentiometer 1 and the three resistors 5, 6 and 7 and its negative terminal connected to potentiometer 1, voltage divider 8, load resistor 10, voltage divider 12 and load resistor 14 by way of a grounded chassis 17.

Figure 2B:
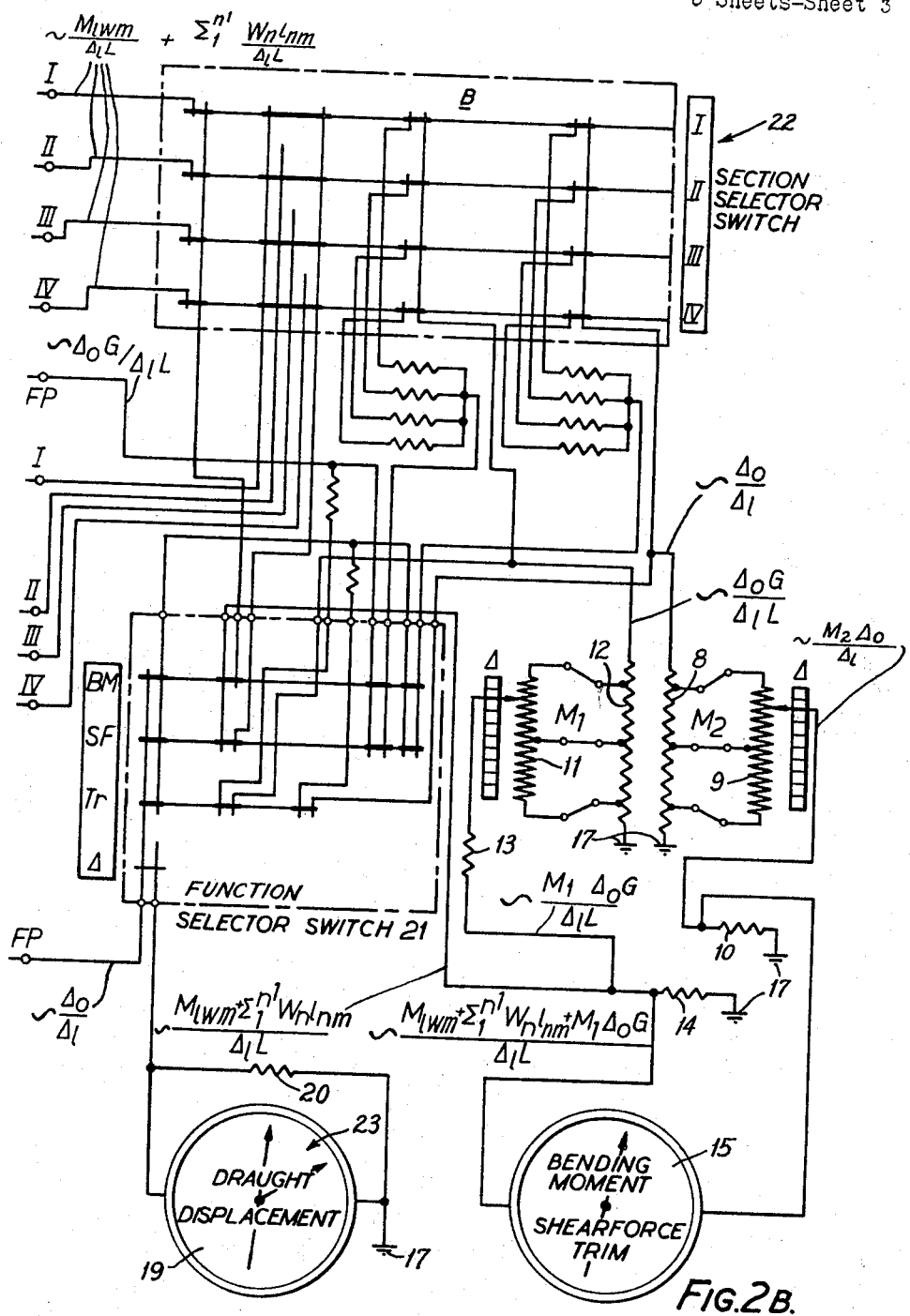

FIGURES 2A and 2B give a circuit for calculating draught, displacement, and trim and shearforce and bending moment at four sections I, II, III, IV, for a ship with six deadweight items.

The position of the deadweight items with respect to the sections I, II, III, IV and foreperpendicular (F.P.) is given in FIGURE 3, which also gives the appearance of a control and display panel for the device Where several deadweight items, i.e. several tanks or holds, have to be considered an input potentiometer 1 is provided for each item. In the drawings six of these are indicated.

For the calculation of displacement each potentiometer 1 is provided with a load resistor 4 generating a current proportional to the quantity indicated in the drawing (e.g. $W_1/\Delta_1$). For the calculation of trim, each input potentiometer 1 is provided with a resistor 3 generating a current proportional to the moment of that item about the foreperpendicular (F.P.).

For the calculation of bending moments the input potentiometers 1 are provided with resistors 2, each generating a current proportional to the quantity indicated in the drawing (e.g. $W_2 l_{1I}/\Delta_1 L$).

For the calculation of shearforces further resistors 4a are provided as necessary, generating currents proportional to the values indicated in the drawing (e.g. $W_1/\Delta_1$).

Parallel to the input potentiometers 1 are provided, for the calculation of displacement, a resistor 7 generating a current proportional to the total lightweight, and for the calculation of trim, a resistor 6 generating a current proportional to the moment of the total lightweight about the F.P.

For the calculation of bending moments resistors 5 are provided generating currents proportional to the lightweight moments about the sections I, II, III and IV (e.g. $M_{1wII}/\Delta_1 L$).

For the calculation of shearforces, resistors 18 are provided generating currents proportional to the light-weight aft of the sections I, II, III and IV (e.g. $P_{1wII}/\Delta_1$).

Two switches are provided, a function selector switch 21 and a section selector switch 22. The various resistors described above are connected to either of these two switches in the following manner:

The resistors 4 and 7 are combined to give a current proportional to total displacement $$\frac{\Delta_0}{\Delta_1} \text{ this being equal to } \left(\frac{P_{1wFP}}{\Delta_1} + \sum_1^6 \frac{W_n}{\Delta_1}\right)$$

This is connected to the function selector switch 21. When the switch is put in position $\Delta$ the current is applied to a suitable meter 19 connected across a load resistor 20. Displacement and draught may then be read off a suitably calibrated scale, the relationship between draught and displacement being known.

The resistors 3 are combined with 6 to give a current proportional to the moment of totalweight about the F.P.

$$\frac{\Delta_0 G}{\Delta_1 L} \text{ being equal to } \left(\frac{M_{1wFP}}{\Delta_1 L} + \sum_1^6 \frac{W_n l_{nFP}}{\Delta_1 L}\right)$$

This is then connected to the function selector switch 21. The resistors 2 are combined with the resistors 5 in such a way that at four points representing the sections I, II, III and IV currents proportional to the moments of all weight items aft of that section about that section are obtained.

$$\text{i. e.} \sim \left(\frac{M_{1wm}}{\Delta_1 L} + \sum_1^{n^1} \frac{W_n l_{nm}}{\Delta_1 L}\right)$$

These are then connected to the section selector switch 2. The resistors 4a are combined with the resistors 18 and connected to the section selector switch 22 in such a way, that by putting the section selector switch 22 in the positions I, II, III or IV, currents proportional to the totalweight aft of those sections are obtained.

The section selector switch 22 and the function selector switch 21 are now interconnected as shown in the drawing. From Equations 1, 2 and 3 it can be seen that a number of dimensionless functions $M_1$, $M_2$, $P_1$, $P_2$, $T_1$, $T_2$, have to be generated, each dependent on draught and M and P also dependent on position of section. As explained above, these functions are generated in the following parts of the circuit.

When the function selector switch 21 is put in the positions Tr, SF or BM, a current proportional to $\Delta_0/\Delta_1$ is supplied to a voltage divider 8. The voltage divider 8 is provided with multiple taps. Across the voltage divider 8 is connected a tapped potentiometer 9 each of its taps connected to a suitable tap on voltage divider 8, as indicated in the drawing. Alternatively a separate voltage divider can be provided for each of the functions to be generated. The wiper of the potentiometer 9 has to be set in accordance with the displacement. To do this the meter 19 is provided with a manually movable pointer 23 which, when made to coincide with the pointer of the meter, correctly sets the wiper of potentiometer 9.

When a bending moment is being calculated a current proportional to $M_2 \Delta_0/\Delta_1$ is generated which is then applied to a load resistor 10.

In the same way a current proportional to $\Delta_0 G/\Delta_1 L$ is supplied to a second voltage divider 12. A tapped potentiometer 11 having its wiper set by the movable pointer 23 of meter 19, is connected across second voltage divider 12 in the same way as tapped potentiometer 9 is connected across voltage divider 8.

A voltage proportional to $$M_1 \Delta_0 G/\Delta_1 L$$

is then applied to a suitable load resistor 13. Combined with the output of the function selector switch a current proportional to $$\left(\frac{M_{1wm} + \sum_{1}^{n^1} W_n l_{nm} + M_1 \Delta_0 G}{\Delta_1 L}\right)$$

is obtained which is then applied to a load resistor 14. The voltage across load resistor 14 when applied to a suitable meter 15 in opposition to the voltage across load resistor 10 will give a deflection of the pointer proportional to the bending moment as given by Equation 1. Meter 15 will also indicate shearforce and trim when the function selector switch is put in the correct position.

As an alternative, load resistor 10 could be a potentiometer with the meter 15 connected to its wiper. The other terminal of the meter could then be connected to the centre of load resistor 14. By manually working the wiper of load resistor 10 the meter 15 could be zeroed and the bending moment, shearforce or trim read from scales provided on a load resistor 10.

As mentioned above this circuit will serve for all geometrically similar ships, regardless of size. To enable one instrument to serve for ships of related design which are not quite geometrically similar, the "fixed" resistors may be made partly variable, being preset to suit the ship in question.

I claim:

1. Apparatus for calculating the bending moment at a vertical section I normal to the longitudinal axis of a ship resulting from one item $W_I$ of deadweight comprising in combination
   a variable potentiometer generating at its wiper a voltage proportional to the deadweight $W_I$ and hence to $W_I/\Delta_1$,
   a first group of three parallel fixed resistors in series with said potentiometer and generating currents proportional to $W_I l_I/\Delta_1 L$, $W_I l_P/\Delta_1 L$, and $W_I/\Delta_1$, where subscript P refers to the moment taken about a given perpendicular,
   a second group of three parallel fixed resistors generating currents proportional to $M_{1wI}/\Delta_1 L$, $M_{1wFP}/\Delta_1 L$, and $P_{1wFP}/\Delta_1$,
   three circuit elements connecting the outputs of the first and second groups of three resistors in pairs to add their currents giving the values $$W_I l_I/\Delta_1 L + M_{1wI}/\Delta_1 L$$
   $$\Delta_0 G/\Delta_1 L = W_I l_{FP}/\Delta_1 L + M_{1wFP}/\Delta_1 L$$
   and $\Delta_0/\Delta_1 = W_I/\Delta_1 + P_{1wFP}/\Delta_1$, a first tapped potentiometer connected to a first one of said circuit elements to receive a current proportional to $\Delta_0/\Delta_1$,
   a first voltage divider connected across said tapped potentiometer and having a wiper set in accordance with the value of $\Delta_0$,
   a load resistor connected to said voltage divider to provide an output voltage at the wiper proportional to $M_2\Delta_0/\Delta_1$,
   a second tapped potentiometer connected to a second one of said circuit elements to receive a current proportional to $\Delta_0 G/\Delta_1 L$,
   a second voltage divider connected across said second potentiometer and having a wiper set in accordance with the value of $\Delta_0$ to provide an output voltage at the wiper proportional to $M_1\Delta_0 G/\Delta_1 L$,
   circuit means connecting said wiper to a third one of said circuit elements to add their outputs and
   a meter connected between said circuit means and said first voltage divider to receive the output thereof in opposition and provide a deflection proportional to said bending moment where
   $\Delta_1$ is the moulded displacement at load draught,
   $W_I l_I$ is the moment of deadweight item $W_I$ distant $l_n$ aft of the section, L is the length of the ship between perpendiculars,
$M_1$ and $M_2$ are dimensionless functions of draught and of position of section,
$\Delta_0$ is the sum of all lightweight and deadweight,
G is the distance of the longitudinal centre of gravity from the fore perpendicular of the ship,
$P_1$ is a dimensionless function of draught.

2. Apparatus for calculating the bending moment at a vertical section I normal to the longitudinal axis of a ship resulting from one item $W_I$ of deadweight comprising in combination
   variable input means having an output proportional to the deadweight $W_I$ and hence to $W_I/\Delta_1$,
   a first group of three circuit stages connected to the output of said variable input means and having outputs proportional to $W_I l_I/\Delta_1 L$, $W_I l_P/\Delta_1 L$, and $W_I/\Delta_1$, where subscript P refers to the moment taken about a given perpendicular,
   a second group of three circuit stages having outputs proportional to $M_{1wI}/\Delta_1 L$, $M_{1wP}/\Delta_1 L$, and $P_{1wP}/\Delta_1$,
   three further circuit stages connecting the outputs of the first and second groups of three circuit stages in pairs to add their outputs giving the values $$W_I l_I/\Delta_1 L + M_{1wI}/\Delta_1 L$$
   $$\Delta_0 G/\Delta_1 L = W_I l_P/\Delta_1 L + M_{1wP}/\Delta_1 L,$$ and
   $$\Delta_0/\Delta_1 = W_I/\Delta_1 + P_{1wP}/\Delta_1$$

first circuit means connected to one said further circuit stage to receive an input proportional to $\Delta_0/\Delta_1$,
   divider means connected to said first circuit means for giving an output proportional to $\Delta_0$,
   an additional circuit stage connected to said divider means to provide an output proportional to $M_2\Delta_0/\Delta_1$,
   second circuit means connected to a second said further circuit stage to receive an input proportional to $\Delta_0 G/\Delta_1 L$,
   second divider means connected to said second circuit means and having adjustment means set in accordance with the value of $\Delta_0$ for giving an output proportional to $M_1\Delta_0 G/\Delta_1 L$,
   third circuit means connecting said adjustment means to a third said further circuit stage to add their outputs, and
   a meter connected between said third circuit means and said first-mentioned divider means to receive the outputs thereof in opposition and provide a reading equivalent to said bending moment,
   said bending moment having been calculated from the expression:

$$BM = \left(\frac{M_{1w}}{\Delta_1 L} + \Sigma \frac{W_I l_I}{\Delta_1 L} + \frac{M_1\Delta_0 G}{\Delta_1 L} - \frac{M_2 \cdot \Delta_0}{\Delta_1}\right)\Delta_1 L$$

where $M_{1w}$ is the moment of all light weight aft of the said section,
$\Delta_1$ is the moulded displacement at load draught,
$W_I l_I$ is the moment of deadweight item $W_I$ distance $l_I$ aft of the said section,
L is the length of the ship between perpendiculars,
$M_1$ and $M_2$ are dimensionless functions of draught and of position of the said section,
$\Delta_0$ is the sum of all lightweight and deadweight,
G is the distance of the longitudinal centre of gravity from the given perpendicular of the ship, and
$P_1$ is a dimensionless function of draught.

3. Apparatus according to claim 2 wherein the apparatus comprises further circuit means operative to calculate additionally shear force, SF, about the said section of the ship from the expression:

$$SF = \left(\frac{P_{1w}}{\Delta_1} + \Sigma \frac{W_n}{\Delta_1} + \frac{P_1\Delta_0 G}{\Delta_1 L} - \frac{P_2\Delta_0}{\Delta_1}\right)\Delta_1$$

where $P_{1w}$ is the total lightweight aft of the said given section,
$\Delta_1$ is the moulded displacement at load draught, $\Delta_0$ is the sum of all lightweight and deadweight,
$W_n$ is the total deadweight aft of the said section,
G is the distance of the longitudinal centre of gravity from the said given perpendicular of the ship,
L is the length of the ship between perpendiculars, and
$P_1$ and $P_2$ are dimensionless functions of draught and of the position of the said section.

4. Apparatus according to claim 2 in which the apparatus comprises further circuit means operative to calculate the trim, $T_r$, about the said section from the expression:

$$T_r \left( T_1 \cdot \frac{\Delta_0 G}{\Delta_1 L} - T_2 \frac{\Delta_0}{\Delta_1} \right) L$$

where $T_1$ and $T_2$ are dimensionless functions of draught, $\Delta_0$ is the sum of all lightweight and deadweight,
$\Delta_1$ is the moulded displacement at load draught,
G is the distance of the longitudinal center of gravity from the said given perpendicular of the ship, and
L is the length of the ship between perpendiculars.

References Cited

UNITED STATES PATENTS

| | | | |
|---|---|---|---|
| 2,865,566 | 12/1962 | Swenson | 235—179 X |
| 3,062,638 | 11/1962 | Kolisch | 235—150.2 |
| 3,128,375 | 4/1964 | Grimmes | 235—150.2 |
| 3,130,301 | 4/1964 | Minter | 235—193 |

MALCOLM A. MORRISON, *Primary Examiner.*

MARTIN P. HARTMAN, *Assistant Examiner.*